3 Sheets—Sheet 1.

G. L. JAEGER

Machine for Lining and Drying Pasteboard.

No. 8,509. Reissued Nov. 26, 1878.

3 Sheets—Sheet 2.

G. L. JAEGER

Machine for Lining and Drying Pasteboard.

No. 8,509. Reissued Nov. 26, 1878.

Witnesses
Otto Hufeland.
Wm Miller.

Inventor.
Gustav L. Jaeger.
by
Van Santvoord & Hauff
his attys.

3 Sheets—Sheet 3.

G. L. JAEGER

Machine for Lining and Drying Pasteboard.

No. 8,509. Reissued Nov. 26, 1878.

Witnesses.
Otto Hupeland
Wm. Miller

Inventor
Gustav L. Jaeger
by
J. Van Santvoord & Kauff
his attys

UNITED STATES PATENT OFFICE.

GUSTAV L. JAEGER, OF NEW YORK, N. Y.

IMPROVEMENT IN MACHINES FOR LINING AND DRYING PASTEBOARD.

Specification forming part of Letters Patent No. 126,301, dated April 30, 1872; Reissue No. 8,509, dated November 26, 1878; application filed November 11, 1878.

*To all whom it may concern:*

Be it known that I, GUSTAV L. JAEGER, of the city, county, and State of New York, have invented a new and useful Improvement in Machines for Lining and Drying Pasteboard, which improvement is fully set forth in the following specification, reference being had to the accompanying drawing, in which—

Figure 1:
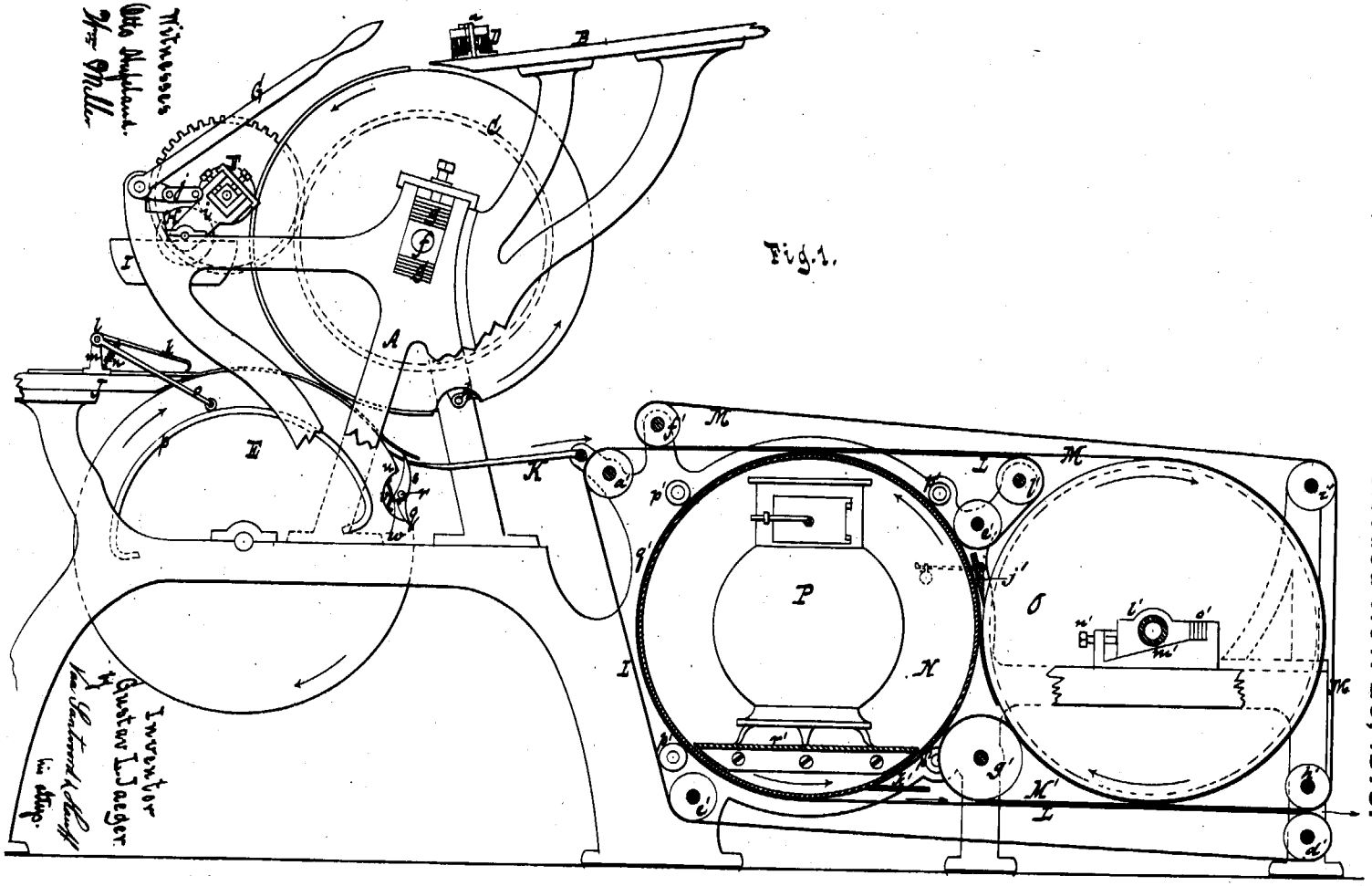
Figure 2:
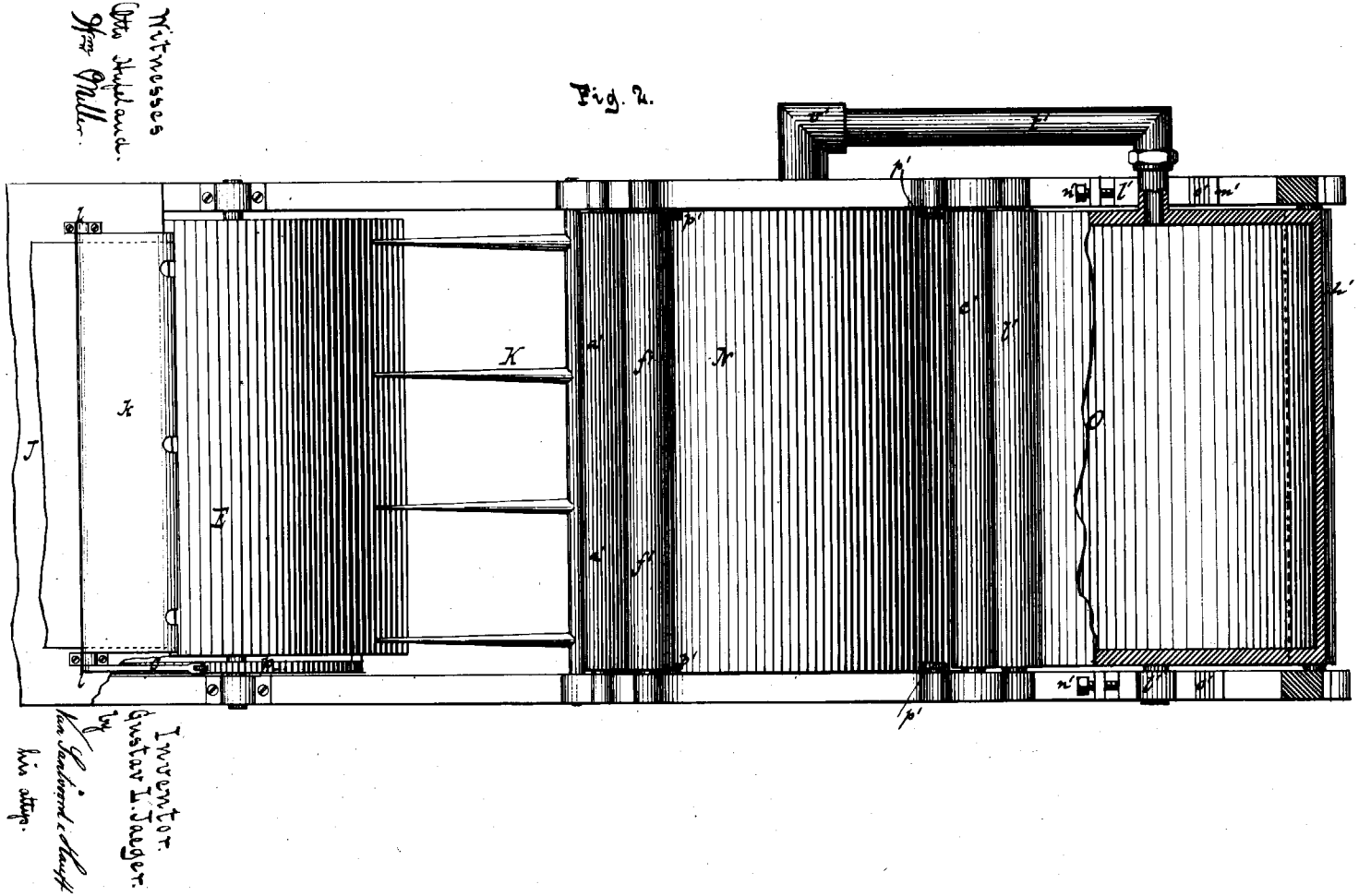
Figure 3:
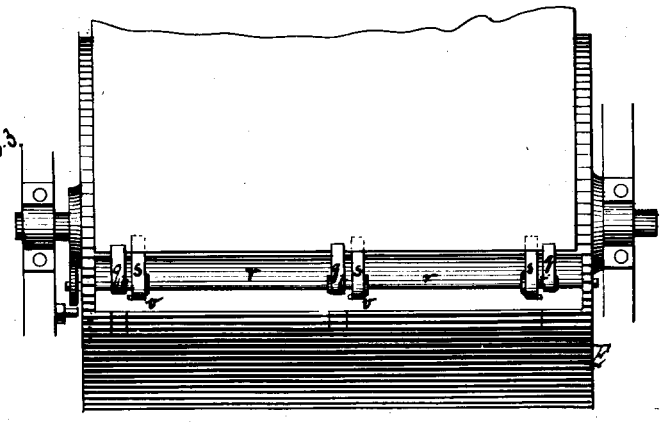
Figure 4:
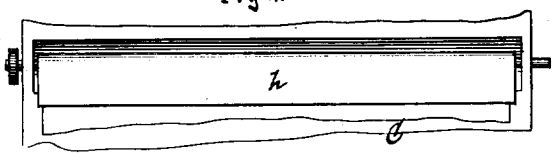
Figure 5:
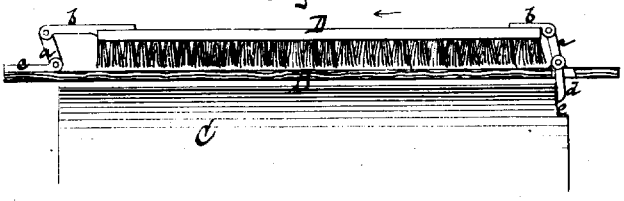
Figure 6:
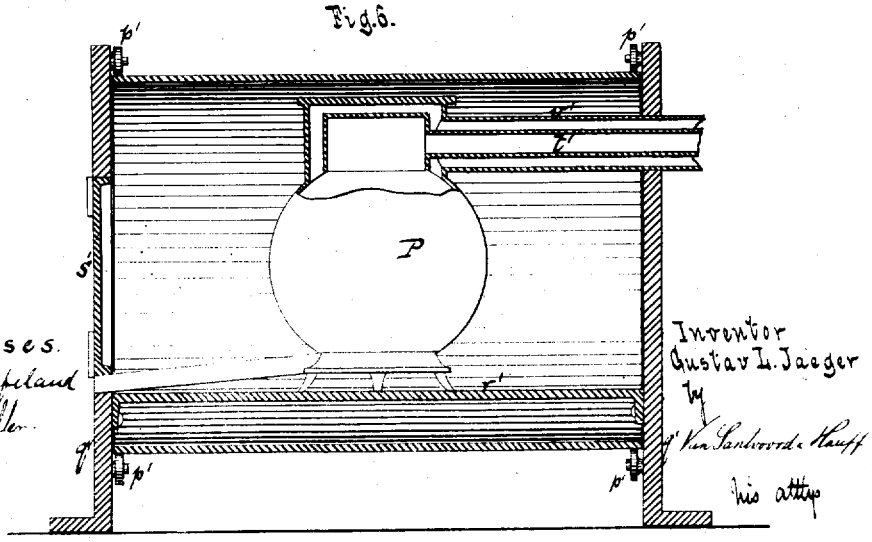

Figure 1 represents a side view, partly in section. Fig. 2 is a plan or top view, partly in section. Fig. 3 is a plan of the pasteboard-cylinders detached, showing the gripers and throwing-off fingers. Fig. 4 is a plan of the paper-cylinder detached, showing the continuous gripers. Fig. 5 is a transverse section of the paper-feed table, showing the brush for removing wrinkles from the sheets of paper before the same are delivered to the paper-cylinder. Fig. 6 is a longitudinal central section of my drying-drum.

Similar letters indicate corresponding parts.

This invention consists in the combination, with the paper-feed table and the paper-cylinder, of a brush which is automatically depressed upon the sheets just as the same are delivered to the paper-cylinder, so that by the action of said brush the sheets of paper are freed from wrinkles before they are delivered to the paper-cylinder; also, in the combination, with the pasting-roller, of the two arms which form the bearings for said roller and swing on pivots, and which connect, by toggle-levers or other suitable mechanism, with a hand or foot lever, so that if, from some cause, no sheet of paper is delivered to the paper-cylinder, the pasting-rollers can be thrown back, thereby preventing the surface of the paper-cylinder from being soiled by paste; further, in the combination, with the pasteboard-cylinder, of a gage which determines the correct position of each board to be delivered to the cylinder, and which is raised automatically by the action of a cam on the side of the cylinder at the moment the gripers take hold of the pasteboard; also, in the combination, with the gripers, of a series of throwing-off dogs or strippers, whereby the pasteboards are effectually prevented from adhering to the pasteboard-cylinder, and their delivery to the drying apparatus is insured; further, in the combination of a stove with a drying-drum, said drum being adapted to revolve round the stove, so that the heat of the drum can be increased or diminished to any desired extent, and also kept at a uniform degree, as may be required; also, in the combination of two drums, one of which has its bearings in journal-boxes set on inclined planes, so that it is caused to bear against the surface of the other drum by its inherent gravity or by springs, whereby the sheets are uniformly calendered while in a half-dry state; further, in a drying apparatus consisting of two drums, with means for maintaining them in a heated state, adapted to receive the separate boards, which are fed to them successively, and bear them along in contact with the drying-drums until they are sufficiently dry. Suitable strippers serve to deliver the pasteboards from the drying-drums to the endless aprons, and from one drying-drum to the other.

In the drawing, the letter A designates a frame, which forms the bearings for the working parts of my machine. On the upper part of this frame is secured a board or table, B, over which the sheets of paper are fed to the paper-cylinder C. Across the feed-table B extends a brush, D, which is supported by links *a*, pivoted at their upper ends to arms *b*, extending from the back of the brush, and at their lower ends to brackets *c*, fastened to the feed-table. (See Fig. 5.)

From one of the links *a* extends an arm, *d*, down through an aperture in the feed-table, and a cam, *e*, formed on one side of the cylinder C, acts against this arm and causes the brush to swing in the direction of the arrow marked near it in Fig. 5, bringing it to bear on the sheet of paper previously passed through under it. By this action of the brush D the sheet of paper is spread out flat upon the feed-table, and it is delivered to the paper-cylinder free from wrinkles. The paper-cylinder has its bearings in boxes *f*, which are set each between two springs, *g*, Fig. 1, so that said paper-cylinder can accommodate itself freely to the varying thicknesses of pasteboards passed through between it and the pasteboard-cylinder E, while it exerts always a sufficient pressure on the pasteboards to cause the sheets of paper to adhere to the same.

The sheets of paper are taken from the feed-table B by means of a griper, *h*, (see Fig. 4,) which extends across the entire length of the paper-cylinder, so that the same will hold the edge of the sheet of paper close down upon the surface of said cylinder, and prevent any paste from getting in between the paper and the cylinder.

If the gripers are placed at certain distances apart, as usually practiced in printing-presses, it is impossible to keep the paste from passing under the sheet, and the correct operation of the machine is disturbed.

The paste is applied to the sheets of paper by means of a pasting-roller, F, which has its bearings in a box, Fig. 1, secured in arms *i*, that are pivoted to the frame A, and connect by links or toggle-joints *j* with a lever, G, which can be operated by hand or foot. If this lever is in the position shown in Fig. 1, the pasting-roller bears against the surface of the sheet of paper carried by the paper-cylinder, and said sheet is supplied with paste; but if, from accident or carelessness, no paper has been delivered to the paper-cylinder the lever G is thrown back, so as to remove the pasting-roller from contact with the paper-cylinder and prevent the surface of the latter from being soiled.

The pasting-roller is supplied with paste by means of a distributing-roller, H, which dips into the paste-well I, and it is geared up, so that its superficial velocity is smaller than that of the paper-cylinder, and that by its action the paper is spread and stretched flat on this last-named cylinder.

The pasteboards are fed to the pasteboard-cylinder E over the table J, their correct position being insured by means of a gage, *k*, which is hung on a shaft, *l*, that has its bearings in standards *m* rising from said table, the gage being depressed by the action of a spring, *n*. On the end of the shaft *l* is mounted a lever, *o*, and on the side of the pasteboard-cylinder is secured a cam, *p*, Fig. 1, which strikes the lever *o* at the proper moment, causing the same to raise the gage, so that the pasteboard can be carried off by the action of the gripers *q* on the pasteboard-cylinder. Said gage extends across the entire length of the pasteboard-cylinder, being provided with notches to allow the gripers to take hold of the board; or the gage may be made in sections, one near each end of the pasteboard-cylinder and one or more between, so as to insure a correct position of each pasteboard to be delivered to said cylinder. I prefer to use a gage extending across the entire cylinder, because it holds curved or bent pasteboards down flat upon the surface of the cylinder.

The gripers *q* are mounted on a shaft, *r*, situated in a cavity in the cylinder, and extending across its whole length, the construction and operation of said gripers being the same as on ordinary printing-presses. With the gripers *q* are combined throwing-off dogs *s*, which are mounted loosely on the shaft *r*, one close to each of the gripers. (See Fig. 3.) From the end of each griper projects a finger, *t*, which catches beneath the adjoining dog, so that, when the gripers are thrown back to the position shown in Fig. 1, the dogs are raised. When the gripers are turned down upon the pasteboard, the points of the dogs drop into cavities *u*, Fig. 1, in the cylinder, being retained in that position by the action of springs *v* bearing on toes *w*, which project from the rear ends of said dogs. When the gripers are thrown open the springs *v* are strained, so that the dogs fall back into said cavities as soon as the gripers begin to close and before they bear down upon the end of the pasteboard.

By the gripers the pasteboard is retained on the pasteboard-cylinder and carried in between the same and the paper-cylinder, and as it comes in contact with the sheet of paper spread on this last-named cylinder the paper, being at that moment released by its gripers, adheres to said pasteboard, and when the pasteboard-cylinder reaches the position shown in Fig. 1 the gripers *q* are thrown back, and the dogs *s* deliver the pasteboard to the grate K, over which it passes to and between the endless aprons L M. One of these aprons, L, extends from a roller, *a'*, around rollers *b' c'*, thence back over the drying-drum N, and from this drum around rollers *d' e'* back to the roller *a'*. The other apron, M, extends from a roller, *f'*, around the calender-roller O, thence over a roller, *g'*, to a roller, *h'*, and from this roller over a roller, *i'*, back to the roller *f'*.

Between the drying-drum and the calender-roller is a stripper, *j'*, the edge of which is held in contact with the periphery of the calender-roller by a weight or other means, and the edge of another stripper, *k'*, extends close to the periphery of the drying-drum.

The pasteboard, on passing from the grate K, is received between the two aprons L M and carried over the drying-drum to the calender-roller, where it is turned down in a gentle curve, and then carried up between said calender-roller and the roller *g'* to be received between the drying-drum and the calendar-roller. The stripper *j'* prevents the pasteboard from adhering to the calender-roller, and compels the same to travel in between the roller *c'* and the drying-drum, where it is received by the apron L, carried over the drying-drum, and delivered between the lower branches of the aprons L M, to be discharged between the rollers *d' h'*, the stripper *k'* preventing it from adhering to the drying-drum. The shaft of the calender-roller O has its bearings in boxes *l'*, which are set on inclined planes *m'*, so that the inherent gravity of said calender-roller causes the same to bear against the drying-drum, and to produce a calendering effect on the half-dried pasteboard, said pasteboard being finally dried in its passage round the drying-drum. With each of the boxes *l'* and the inclined planes *m'* is combined a set-screw, *n'*, and a spring, *o'*, the latter to allow the calender-roller to accommodate itself to the varying thicknesses of the pasteboards and the former to regulate the position of the calender-roller in regard to the drying-drum. The drying-drum N (see Figs. 1 and 6) consists of a cylinder which is open at both ends, and supported by rollers $p'$ secured to upright plates $q'$, which are fastened down to the bed of the machine. Said upright plates are connected by a platform, $r'$, (see Fig. 6,) which forms the support for a stove, P. The drum N, which receives its motion from the apron L, is thus caused to revolve round the stove P, and by means of said stove the drum can be heated to any desired degree. In one of the stationary upright plates $q'$ is a door, $s'$, through which access can be had to the stove for the purpose of attending to the fire, and the smoke is carried off through a flue, $t'$, extending out through either of the upright plates. With the flue $t'$ may be combined a hot-air flue, $v'$, to utilize the waste heat.

The stove P may be of any desired construction, so that the direct action of the heat is utilized for heating the drum N, and I prefer this means for heating said drum to steam or hot air, because by the stove I am enabled to regulate the heat without difficulty, and, furthermore, the object can be accomplished with greater economy.

By the combination of the two aprons L M with the calender-roller O and drying-drum N, the pasteboard is carried through between said roller and drum and round the latter without being subjected to any short bends or curves, so that the pasteboards, on being discharged from the apparatus, are dry and fit for immediate use.

It must be remarked that the calender-roller O will also be so constructed that it may be heated either by the waste heat from the drying-drum or by steam or hot air introduced through its hollow gudgeons, and as the pasteboard passes over the calender-roller it is first dried on one side, then it is reversed and dried on the other side by contact with the drying-drum.

What I claim as new, and desire to secure by Letters Patent, is—

1. The combination of a brush for spreading the paper with the feed-table leading to the paper-cylinder, said brush being actuated by a cam on the side of the paper-cylinder, substantially as herein shown and described.

2. The combination, with the paper-cylinder and with the pasting device, of gripers $h$, extending throughout the entire length of the paper-cylinder, substantially as and for the purpose set forth.

3. The combination of the pasting device with two arms, which form the bearings for said roller, and are hinged to the main frame, and with a lever adapted to be actuated by hand or foot, substantially as described, so as to allow of throwing the paste-roller out of contact with the paper-cylinder whenever it may be desirable.

4. The combination, with the pasteboard-cylinder, of a gage, $k$, and of mechanism adapted to raise said gage at the proper moment to allow the pasteboard to be carried in by the gripers of said pasteboard-cylinder, substantially as set forth.

5. The combination of throwing-off dogs with the gripers of the pasteboard-cylinder, substantially as and for the purpose herein shown and described.

6. The combination, with the drying-drum, of a stove situated in the interior of the drum, said drum being adapted to revolve round the stove, substantially as and for the purpose set forth.

7. The combination, with the calender-roller, of journal-boxes adapted to be moved by the gravity of said roller toward the drying-drum, substantially as and for the purpose described.

8. The combination of two endless aprons, L M, with the calender-roller O and drying-drum N, substantially as set forth.

9. The combination, in a drying apparatus for pasteboards, of two drums, with means for maintaining them in a heated state, and two endless aprons adapted to receive the separate boards, which are fed to them successively, and bear them along in contact with the drying-drum, substantially as shown and described.

10. The combination, with the drums or rollers N O and the aprons L M, of suitable strippers for lifting the pasteboards from the drums and guiding them forward between the belts, substantially as set forth.

11. The combination, in an apparatus for drying pasteboards, of two or more drying-cylinders and two or more continuous belts or aprons, so arranged relatively to the drying-cylinders as to bear the separate boards continuously forward in contact with the drying-cylinder and deliver them at the exit, the feeding-apron also so arranged as to form a convenient surface to receive the boards as they are fed to it, and so arranged relatively to another continuous bed or apron that the boards shall be delivered from between the two in a smooth and flat form, substantially as shown and described.

In testimony that I claim the foregoing I hereunto set my hand and seal this 6th day of November, 1878.

GUSTAV L. JAEGER. [L. S.]

Witnesses:
W. HAUFF,
E. F. KASTENHUBER.